United States Patent [19]

Hatsuno et al.

[11] 4,231,251

[45] Nov. 4, 1980

[54] APPARATUS FOR SENSING SCHNARREN PHENOMENON IN FUEL INJECTION LINE

[75] Inventors: Hiroshi Hatsuno; Jinpei Fukazawa; Mitsuo Fukushima; Shinji Ogawa, all of Higashimatsuyama, Japan

[73] Assignee: Ricoh Company, Ltd., Tokyo, Japan

[21] Appl. No.: 30,916

[22] Filed: Apr. 17, 1979

[30] Foreign Application Priority Data

Apr. 24, 1978 [JP] Japan ................................ 53/48420

[51] Int. Cl.³ ........................................ G01M 19/00
[52] U.S. Cl. ........................................ 73/119 A
[58] Field of Search .................... 73/119 A, 116, 115, 73/117.3, 714

[56] References Cited

U.S. PATENT DOCUMENTS

| | | | |
|---|---|---|---|
| 3,522,532 | 8/1970 | McCoy | 73/116 X |
| 4,102,181 | 7/1978 | Cser et al. | 73/119 A |

*Primary Examiner*—Jerry W. Myracle
*Attorney, Agent, or Firm*—David G. Alexander

[57] ABSTRACT

A sensor (16) produces an electrical signal corresponding to the pulsating pressure in a high pressure fuel line (13) leading to a fuel injection valve (14), the pulsations being produced by opening and closing of the valve (14). The electrical signal and a reference signal are fed to a cathode ray tube display unit (18) to produce a Lissajous figure. The shape of the Lissajous figure indicates whether the Schnarren phenomenon is present and, if so, to what extent. The frequencies or amplitudes of the electrical signal and reference signal are compared to produce a signal indicating the difference therebetween which is fed to a digital display unit (22).

6 Claims, 1 Drawing Figure

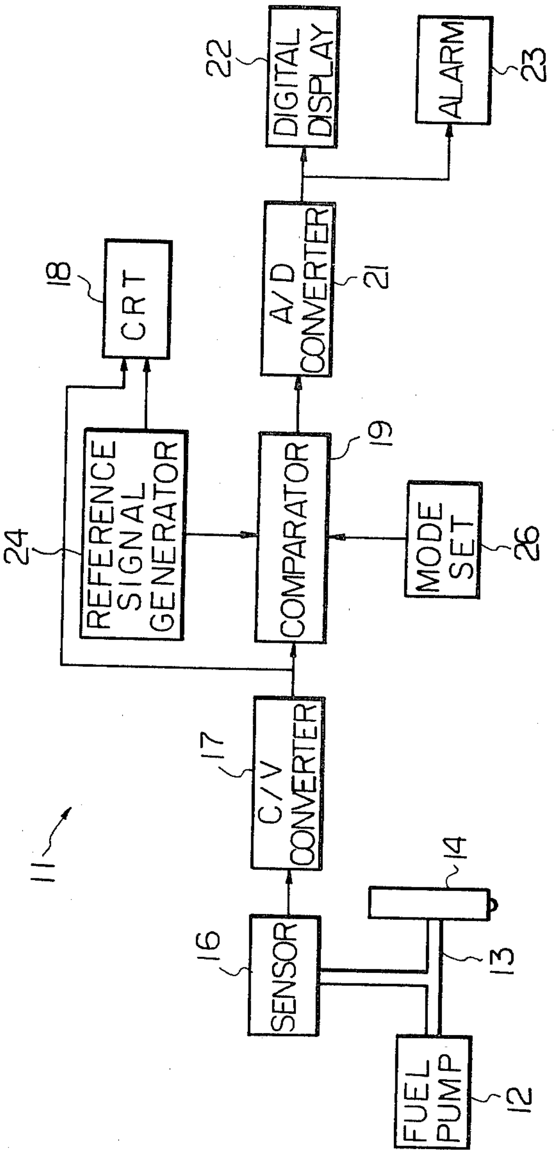
DIGITAL DISPLAY
22
ALARM
23
CRT
18
A/D CONVERTER
21
REFERENCE SIGNAL GENERATOR
24
COMPARATOR
19
MODE SET
26
C/V CONVERTER
17
11
14
SENSOR
16
13
FUEL PUMP
12

APPARATUS FOR SENSING SCHNARREN PHENOMENON IN FUEL INJECTION LINE

BACKGROUND OF THE INVENTION

The present invention relates to an apparatus for sensing the Schnarren phenomenon in a high pressure fuel injection line for an internal combustion engine.

Fuel injection systems for internal combustion engines are desirable because they provide high efficiency. Generally, such fuel injection systems comprise a fuel pump which supplies fuel at elevated pressure to a fuel injection valve. The valve is alternatingly opened and closed at proper timing in the engine operating cycle to inject fuel into the engine combustion chamber, thus producing pulsating fluid pressure in a line leading from the pump to the valve.

A problem which occurs frequently in the design and maintenance of fuel injected engines is the Schnarren phenomenon which is constituted by vibration of the fuel injection valve element at low values of fuel injection volume. This effect results in erratic fuel injection and substantially degraded operating efficiency.

In order to properly design and maintain a fuel injection system, it is necessary to accurately sense and measure the presence of the Schnarren phenomenon. However, apparatus for accomplishing this purpose has not been developed heretofore. Instead, the phenomenon has been sensed in a subjective manner by observing the fuel injection from a valve and/or listening to the sound produced by the valve during operation. The results of such evaluation naturally depend on the subjective determination of the observer and cannot be applied to a display unit, recorder, computer or the like for objective numerical analysis.

SUMMARY OF THE INVENTION

An apparatus embodying the present invention for sensing a Schnarren phenomenon in a fuel injection line comprises sensor means connected to the line for producing an electrical signal corresponding to fluid pressure in the line, reference signal means for producing a reference signal having a predetermined frequency and display means for displaying the electrical signal and the reference signal.

In accordance with the present invention, a sensor produces an electrical signal corresponding to the pulsating pressure in a high pressure fuel line leading to a fuel injection valve, the pulsations being produced by opening and closing of the valve. The electrical signal and a reference signal are fed to a cathode ray tube display unit to produce a Lissajous figure. The shape of the Lissajous figure indicates whether the Schnarren phenomenon is present and, if so, to what extent. The frequencies or amplitudes of the electrical signal and reference signal are compared to produce a signal indicating the difference therebetween which is fed to a digital display unit.

It is an object of the present invention to provide an apparatus for sensing the Schnarren phenomenon in a high pressure fuel injection line and produce an objective and quantative measure of the effect.

It is another object of the present invention to provide an apparatus for sensing the Schnarren phenomenon in a high pressure fuel injection line which may be used by a minimally trained operator but still produce accurate results.

It is another object of the present invention to provide an apparatus for sensing the Schnarren phenomenon in a high pressure fuel injection line which may be produced economically and efficiently on a commercial production basis using available standardized component parts.

It is another object of the present invention to provide a generally improved apparatus for sensing the Schnarren phenomenon in a high pressure fuel injection line.

Other objects, together with the foregoing, are attained in the embodiment described in the following description and illustrated in the accompanying drawing.

BRIEF DESCRIPTION OF THE DRAWING

The single FIGURE of drawing is a block diagram of an apparatus for sensing the Schnarren effect in a high pressure fuel injection line embodying the present invention.

DESCRIPTION OF THE PREFERRED EMBODIMENT

While the apparatus for sensing the Schnarren phenomenon in a high pressure fuel injection line of the present invention is susceptible of numerous physical embodiments, depending upon the environment and requirements of use, substantial numbers of the herein shown and described embodiment have been made, tested and used, and all have performed in an eminently satisfactory manner.

Referring now to FIG. 1 of the drawing, a sensing apparatus embodying the present invention is generally designated by the reference numeral 11 and comprises a fuel pump 12. The fuel pump 12 is driven by an internal combustion engine (not shown) and supplies fuel at elevated pressure through a supply passageway or line 13 to a fuel injector or valve 14.

The present apparatus 11 may be used in various types of fuel injection systems and other applications unrelated to internal combustion engines. In one application the pump 12 functions merely to supply fuel to the injector 14. The injector 14 in such a case comprises an engine driven piston or plunger (not shown) which injects fuel at high pressure into the engine. Alternatively, the pump 12 may comprise such a plunger and supply fuel to the injector 14 at high pressure. In such a case, the injector 14 merely comprises a spring loaded valve (not shown) which opens to allow fuel injection when the pressure supplied from the pump 12 exceeds the preload of the spring. It will thus be seen that the present apparatus is capable of measuring various ranges of fluid pressure.

In accordance with the present invention a pressure sensor 16 is connected to the line 13 to sense the magnitude of pressure therein. Preferably, the sensor 16 comprises an electrically conductive diaphragm which is movable relative to another electrically conductive diaphragm to an extent corresponding to the fluid pressure in the line 13. The electrical capacitance between the two diaphragms varies as a function of the distance therebetween which in turn is a function of the pressure in the line 13. The sensor 16 is constructed to produce an electrical current which corresponds to, and is preferably proportional to, the pressure in the line 13. A sensor which operates on these principles and which may be utilized as the sensor 16 is manufactured by the Ohkura Electric Company, Ltd. of Japan and is designated as ALPHALINE Model 1151GP. This particular sensor produces an output current ranging from 4–20 mA in response to input pressures ranging from 0–127 $mmH_2O$. The range of diaphragm movement in this sensor is 0–0.1 mm.

The output of the sensor 16 is fed to a current to voltage converter 17 which produces an electrical output voltage or signal proportional to input current. This voltage corresponds to the pressure in the line 13.

The output of the converter 17 is connected to inputs of a cathode ray tube (CRT) display unit 18 and to a comparator 19. The output of the comparator 19 is connected through an analog to digital converter 21 to a digital display unit 22 and an alarm 23 which may be a flashing light, bell, buzzer, siren, horn or the like.

A reference signal generator 24 produces a reference signal which is fed to inputs of the CRT 18 and the comparator 19. A mode set unit 26 is connected to the comparator 19 to set the operating mode and comparision levels therein. The CRT 18 has two orthogonal inputs (not designated) which are connected to the outputs of the converter 17 and reference signal generator 24 respectively.

The reference signal produced by the generator 24 is selected to have a frequency, amplitude, D.C. level and waveform which correspond to the output of the converter 17 under optimum operating conditions of the injector valve 14. Since the valve 14 functions by alternatingly opening and closing at the proper timing in the engine cycle, the pressure in the line 13 fluctuates or pulsates in a periodic manner. Thus, the output of the converter 17 and the output of the signal generator 24 applied to the CRT 18 produce a 1:1 Lissajous figure under optimum operating conditions of the valve 14.

However, when the Schnarren phenomenon is present, the element (not shown) of the valve 14 will vibrate and the frequency of the output signal of the converter 17 will be higher than the frequency of the reference signal from the generator 24. Thus, the display on the CRT 18 will be a Lissajous figure having a pattern other than 1:1. The particular pattern will depend on the frequency ratio and phase relationship between the applied input signals. The greater the number of lobes in the Lissajous figure, the greater the degree of vibration of the element of the valve 14 and the more severe the Schnarren phenomenon.

The comparator 19 produces an output signal indicating the difference between the output signal of the converter 17 and the reference signal. The difference may be the difference in frequency or A.C. amplitude. The A.C. amplitude of the output signal of the converter 17 will decrease as the severity of the Schnarren phenomenon increases, since increased vibration will result in lower lift of the element of the valve 14 and thereby a smaller pressure fluctuation in the line 13. The converter 21 produces a digital signal corresponding to the analog output signal of the comparator 19 which is displayed by the display unit 22. The alarm 23 is constructed to be energized when the magnitude of the output signal of the converter 21 exceeds a predetermined value indicating that the Schnarren phenomenon is present to an intolerable extent.

In summary, it will be seen that the present invention provides an apparatus for sensing the Schnarren phenomenon in a high pressure fuel injection line which overcomes the shortcomings of the prior art and produces accurate, objective and quantative results. Various modifications will become possible for those skilled in the art after receiving the teachings of the present disclosure without departing from the scope thereof.

For example, the output of the comparator 19 may be connected to the CRT 18 instead of the output of the reference signal generator 24. As another modification, the CRT 18 may be modified to provide a display such that the output signal of the converter 17 and the reference signal are displayed along the same axis instead of orthogonally. In this case, the signals may be superimposed on each other along a single horizontal axis or may be displayed one above the other along two vertically spaced horizontal axes.

What is claimed is:

1. An apparatus for sensing a Schnarren phenomenon in a fuel injection line, characterized by comprising:
- sensor means connected to the line for producing an electrical signal corresponding to fluid pressure in the line;
- reference signal means for producing a reference signal having a predetermined frequency; and
- display means for displaying the electrical signal and the reference signal;
- the display means comprising a visual display unit having orthogonal inputs, the electrical signal being applied to one of said orthogonal inputs and the reference signal being applied to another of said orthogonal inputs so as to produce a Lissajous figure.

2. An apparatus for sensing a Schnarren phenomenon in a fuel injection line, characterized by comprising:
- sensor means connected to the line for producing an electrical signal corresponding to fluid pressure in the line;
- reference signal means for producing a reference signal having a predetermined frequency;
- display means for displaying the electrical signal and the reference signal; and
- comparator means for comparing a frequency of the electrical signal with a frequency of the reference signal and producing an output indicating a difference therebetween.

3. An apparatus as in claim 2, further comprising a display unit for displaying the output of the comparator means.

4. An apparatus for sensing a Schnarren phenomenon in a fuel injection line, characterized by comprising:
- sensor means connected to the line for producing an electrical signal corresponding to fluid pressure in the line;
- reference signal means for producing a reference signal having a predetermined frequency;
- display means for displaying the electrical signal and the reference signal; and
- comparator means for comparing an amplitude of the electrical signal with an amplitude of the reference signal and producing an output indicating a difference therebetween.

5. An apparatus as in claim 4, further comprising a display unit for displaying the output of the comparator means.

6. An apparatus as in claim 2 or 4, further comprising alarm means connected to the comparator means so as to be energized when said difference exceeds a predetermined value.

* * * * *

UNITED STATES PATENT AND TRADEMARK OFFICE
CERTIFICATE OF CORRECTION

PATENT NO. : 4,231,251

DATED : Nov. 4, 1980

INVENTOR(S) : Hiroshi Hatsuno et al.

It is certified that error appears in the above—identified patent and that said Letters Patent is hereby corrected as shown below:

On the title page the assignee should read

-- Diesel Kiki Company, Ltd.,
Tokyo, Japan --.

Signed and Sealed this

*Fifth* Day of *May 1981*

[SEAL]

*Attest:*

RENE D. TEGTMEYER

*Attesting Officer* *Acting Commissioner of Patents and Trademarks*